United States Patent
Kempton et al.

(10) Patent No.: US 7,124,856 B2
(45) Date of Patent: Oct. 24, 2006

(54) ACOUSTIC LINER FOR GAS TURBINE ENGINE

(75) Inventors: Andrew J Kempton, Derby (GB); Nicholas J Baker, Nottingham (GB); Alan McAlpine, Southampton (GB); Jeremy Astley, Southampton (GB)

(73) Assignee: Rolls-Royce plc, London (GB)

( * ) Notice: Subject to any disclaimer, the term of this patent is extended or adjusted under 35 U.S.C. 154(b) by 381 days.

(21) Appl. No.: 10/673,576

(22) Filed: Sep. 30, 2003

(65) Prior Publication Data

US 2006/0011408 A1    Jan. 19, 2006

(30) Foreign Application Priority Data

Oct. 14, 2002   (GB) .................................. 0223697.4

(51) Int. Cl.
*E04B 1/82*       (2006.01)
(52) U.S. Cl. ..................... 181/284; 181/210; 181/290; 181/293; 415/119; 60/725
(58) Field of Classification Search ................ 181/284, 181/290, 293, 207, 206, 210; 60/725; 415/119
See application file for complete search history.

(56) References Cited

U.S. PATENT DOCUMENTS

| | | | |
|---|---|---|---|
| 4,192,336 A * | 3/1980 | Farquhar et al. ............ 181/214 |
| 5,498,127 A * | 3/1996 | Kraft et al. .................. 181/206 |
| 5,782,082 A | 7/1998 | Hogeboom | |
| 5,979,593 A | 11/1999 | Rice | |
| 6,206,136 B1 * | 3/2001 | Swindlehurst et al. ...... 181/290 |
| 2003/0098200 A1* | 5/2003 | Clark ......................... 181/292 |

FOREIGN PATENT DOCUMENTS

EP        1085196 A1 *   3/2001

\* cited by examiner

*Primary Examiner*—Lincoln Donovan
*Assistant Examiner*—Eduardo Colon Santana
(74) *Attorney, Agent, or Firm*—W. Warren Taltavull; Manelli Denison & Selter PLLC

(57) ABSTRACT

A passive acoustic liner system (50) for attenuating a sound field comprising, in acoustic series, a mode-scattering segment (48) and a sound-absorbing segment (40), wherein the mode scattering segment (48) provides a reactance between $-12$ and $-2$ $\rho c$ and the sound absorbing segment (40) provides a reactance between $-1$ and $0$ $\rho c$ thereby providing a reactance discontinuity such that mode-scattering of the sound field enables the sound-absorbing segment (48) to further absorb the scattered sound.

11 Claims, 2 Drawing Sheets

ACOUSTIC LINER FOR GAS TURBINE ENGINE

FIELD OF THE INVENTION

The present invention relates to acoustic liner systems and methods for attenuating noise, for example in a duct of a gas turbine engine, and in particular where attenuation is achieved by acoustic mode-scattering and subsequent absorption of altered modes or pressure patterns.

BACKGROUND OF THE INVENTION

Acoustic liners within an intake or exhaust nozzle of an aero-engine play an important role in reducing the noise that is radiated to the environment.

The noise field within an aero-engine intake can be characterised as a summation of spinning modal pressure patterns substantially generated by the propulsive low-pressure fan. As these noise patterns or modes propagate through and out of the intake, acoustic liners disposed within the intake, attenuate some of the noise. The passive acoustic liners are typically made up of a layer of honeycomb cells backed by an impervious sheet and with a porous face sheet. As the acoustic pressure patterns sweep past the liners, air is driven through the porous layer and into the honeycomb cells dissipating the acoustic energy as heat. The thickness of the honeycomb layer determines the peak absorption frequency. The overall impedance of an acoustic liner is a complex number split into a real part, the resistance, and an imaginary part, the reactance. For this type of liner, the resistance is determined primarily by the porosity of the facing-sheet and the thickness of the honeycomb layer determines the reactance, which is a function of frequency.

Currently passive acoustic liners are often optimised assuming that the acoustic modes propagate uniformly over the length of the intake. However, it has been shown that acoustic energy may be redistributed or scattered between propagating modes with different attenuation characteristics. If the energy can be redistributed from modes that are less attenuated by the acoustically downstream liner to modes that are more easily attenuated, then the overall effectiveness of the intake liner system can be significantly increased.

U.S. Pat. No. 5,782,082 to Hogeboom et al., recites a multi segment liner system of an aircraft engine, whereby the redistribution of acoustic energy is caused by a section of scattering liner having a low resistance (0 to 0.5 ρc) and reactance close to zero followed by a layer of absorptive liner having a more typical higher resistance but a similar reactance close to zero. For a particular frequency to be attenuated the cell depth is between 19 mm and 76 mm, which approximately equates to ¼ wavelength. U.S. Pat. No. 5,782,082 teaches the use of a facing sheet having a low "resistance"/high porosity so that sound is attenuated by the particular cell depth. "Resistance" relates to the pressure drop of the sound field across the facing sheet. This system has the disadvantage that the low resistance scattering segment does not cause scattering of the some of the dominant incident pressure patterns encountered at high fan operating speeds. Further, the thickness of the acoustic liner is determined by the length of the cells requiring to be ¼ wavelength, thus leading to an overly thick and heavy liner.

U.S. Pat. No. 5,979,593 to Rice et al., disclose a hybrid multi segment liner system wherein the redistribution of acoustic energy is caused by a section of active control components. The active control components either steer or scatter the noise into higher-order modes so that a further sound-absorbing segment may more easily absorb the redistributed noise. However, this system has the disadvantage of the added complexity, weight and reliability problems associated with active control systems.

GB2,038,410 to Chapman, discloses an acoustic liner comprising Helmholtz-type and tube-type resonators that are sandwiched between backing and facing sheets. The ends of the tube-type resonators abut the Helmholtz resonators but are acoustically divided from them by a partition so that the tube-type resonators differ from each other in resonant frequency according to which portion of the partition acoustically divides them from the Helmholtz-type resonators. The partition is arranged in either step-wise or inclindly between the backing and facing sheets. In step-wise configuration the acoustic lining is capable of absorbing three separate narrow high frequency bands rather than one wide high frequency band. However, this design is limited to attenuating specific acoustic frequencies using specifically tuned liner segments. Furthermore, this design does not employ mode scattering to augment the attenuation of the sound field.

SUMMARY OF THE INVENTION

Therefore it is an object of the present invention to provide an acoustic liner system that is capable of attenuating broadband acoustic frequency in a passive liner system and which is achievable at a low cost, low weight, is easy to maintain and with high reliabilty.

Accordingly, a passive acoustic liner system for attenuating a sound field comprising, in downstream acoustic series, a mode-scattering segment and a sound-absorbing segment, wherein the mode scattering segment comprises a reactance between $-12$ and $-2$ $\rho c$ and the sound absorbing segment comprises a reactance between $-1$ and $0$ $\rho c$ thereby providing a reactance discontinuity such that mode-scattering of the sound field enables the sound-absorbing segment to further absorb the scattered sound.

Preferably, the difference in reactance between the sound-absorbing segment and the mode scattering segment is achieved by a difference in thickness of the segments.

Alternatively, the difference in reactance between the sound-absorbing segment and the mode scattering segment is achieved by the mode scattering segment comprising a porous material.

BRIEF DESCRIPTION OF THE DRAWINGS

The present invention will be more fully described by way of example with reference to the accompanying drawings in which.

DETAILED DESCRIPTION OF THE INVENTION

Figure 1:
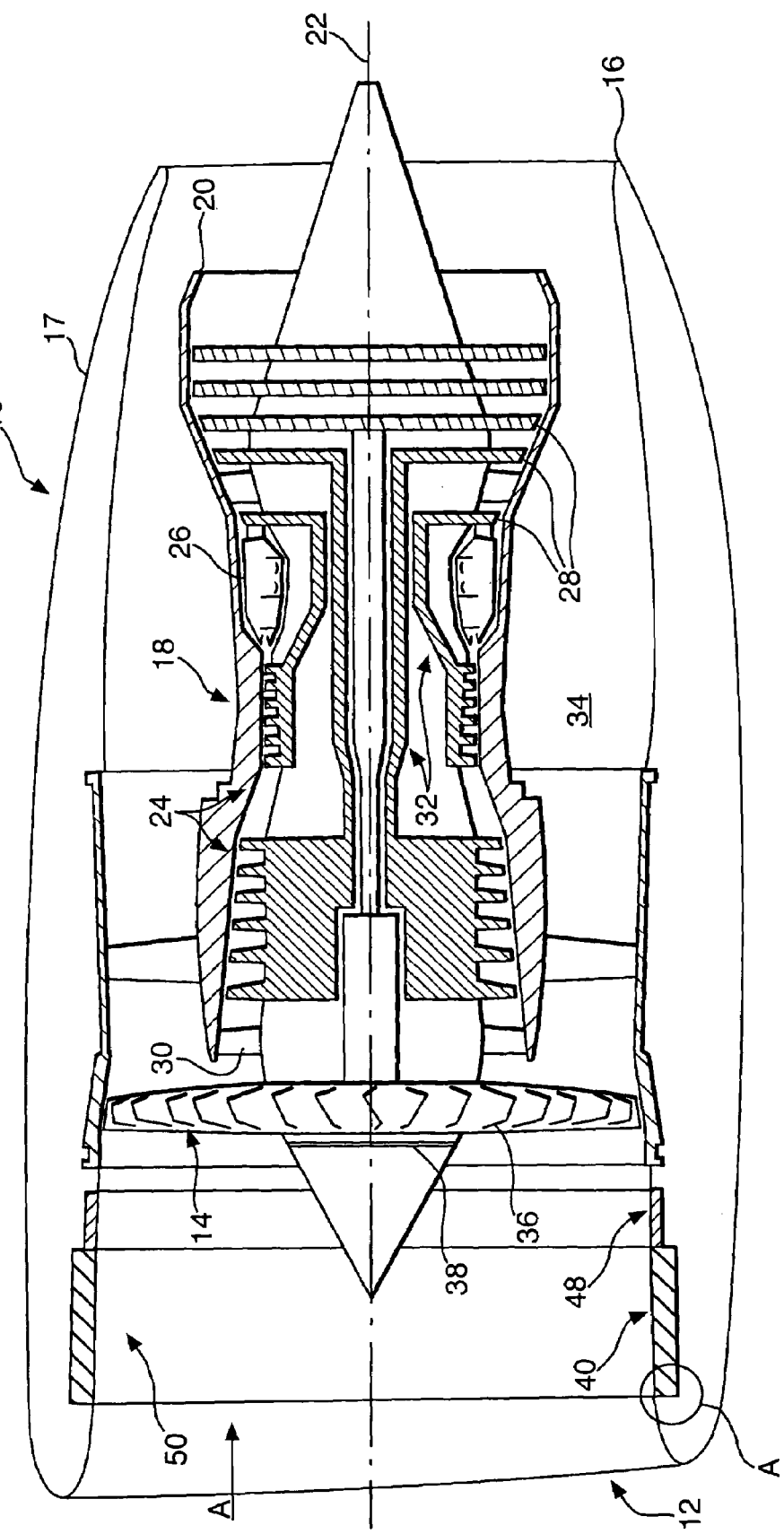
FIG. 1 is a schematic section of a ducted fan gas turbine engine incorporating a passive acoustic liner system in accordance with a first embodiment the present invention.

With reference to FIG. 1 a ducted fan gas turbine engine 10 comprises, in axial flow series an air intake 12, a propulsive fan 14, a core engine 18 and a core exhaust nozzle assembly 20 all disposed about a central engine axis 22 and surrounded by an outer and generally annular bypass wall 17.

The core engine 18 comprises, in axial flow series, a series of compressors 24, a combustor 26, and a series of turbines 28. The series of turbines 28 are drivingly connected to the compressors 24 and propulsive fan 14.

The direction of airflow through the engine 10 in operation is shown by arrow A. Air is drawn in through the air intake 12 and is compressed and accelerated by the fan 14. The air from the fan 14 is split between a core engine flow and a bypass flow. The core engine flow passes through an annular array of stator vanes 30 and enters the core engine 18, flows through the core engine compressors 24 where it is further compressed, and into the combustor 26 where it is mixed with fuel which is supplied to, and burnt within the combustor 26. Combustion of the fuel mixed with the compressed air from the compressors 24 generates a high energy and velocity gas stream that exits the combustor 26 and flows downstream through the turbines 28. As the high energy gas stream flows through the turbines 28 it rotates turbine rotors extracting energy from the gas stream which is used to drive the fan 14 and compressors 24 via engine shafts 32 which drivingly connect the turbine 28 rotors with the compressors 24 and fan 14. Having flowed through the turbines 28 the high energy gas stream from the combustor 26 still has a significant amount of energy and velocity and it is exhausted, as a core exhaust stream, through the core engine exhaust nozzle assembly 20 to provide propulsive thrust. The remainder of the air from, and accelerated by, the fan 14 flows within a bypass duct 34 around the core engine 18. This bypass air flow, which has been accelerated by the fan 14, flows to an exit bypass nozzle assembly 16 where it is exhausted, as a bypass exhaust stream to provide further, and in fact the majority of, the useful propulsive thrust. The fan 14 comprises an annular array of fan blades 36 which are retained by a fan disc 38.

The propulsive fan 14 generates a sound field that travels through and subsequently out of the intake duct 12. The sound field 12 can be characterised as a summation of spinning modal pressure patterns issuing from the fan 14. As these noise patterns or modes propagate down the intake 12, acoustic liners 40 disposed substantially around the circumference of the radially inner wall of the intake 12, attenuate some of the sound field.

Figure 2:
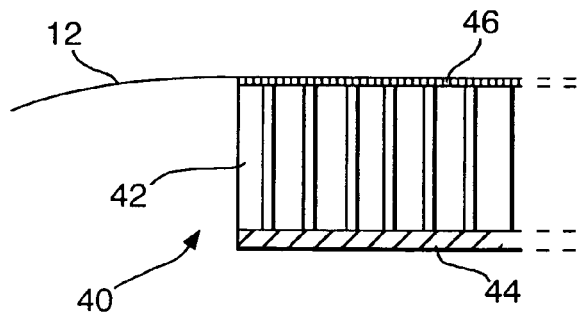
FIG. 2 is an enlarged view on A shown on FIG. 1 and showing a prior art liner configuration.

Conventional acoustic liners 40, shown on FIG. 2, are sandwich panels, typically made up of a layer of cells 42 backed by an impervious sheet 44 and having a porous face sheet 46 that is exposed to the sound field. It is common that the cells 42 comprise a honeycombed structure, the cells being open to and aligned normal to the main plane of the face sheet 46. However, other shaped cells such as circular or square cross-section may also be used to similar effect. Furthermore, the cells may also be angled relatively to the plane of the facing sheet, thereby increasing their length relative to the overall thickness of the liner 40. It is also known for passive acoustic liners 40 to comprise two or more layers of honeycomb cells 42, each layer separated by a further impervious sheet 44.

As the noise pressure patterns sweep past the acoustic liners 40, the air is driven through the porous face sheet 46 and into the cells 42 dissipating the acoustic energy as heat. The (radial) thickness of the layer of honeycomb cells 42 determines the peak absorption frequency. The overall impedance of an acoustic liner 40 is a complex number split into a real part, the resistance, and an imaginary part, the reactance. For this type of acoustic liner 40, the resistance is determined primarily by the porosity of the face sheet 46; the thickness of the layer of honeycomb cells 42 substantially determines the reactance, which is a function of the generated noise frequency.

A passive acoustic liner system 50, in accordance with the present invention, comprises in downstream acoustic series, a mode-scattering segment 48 and a sound-absorbing segment 40. For this particular application of the present invention, the mode-scattering segment 48 is designed to improve attenuation of sound at frequencies around the fan blade passing frequency (BPF), generated at a high engine power operating condition, which for this specific example is in the region of 1500 Hz. The mode-scattering segment 48 is specifically designed to scatter or redistribute noise in the region of 1500 Hz, although it is capable of scattering noise in the range 750 Hz to 3000 Hz.

Figure 3:
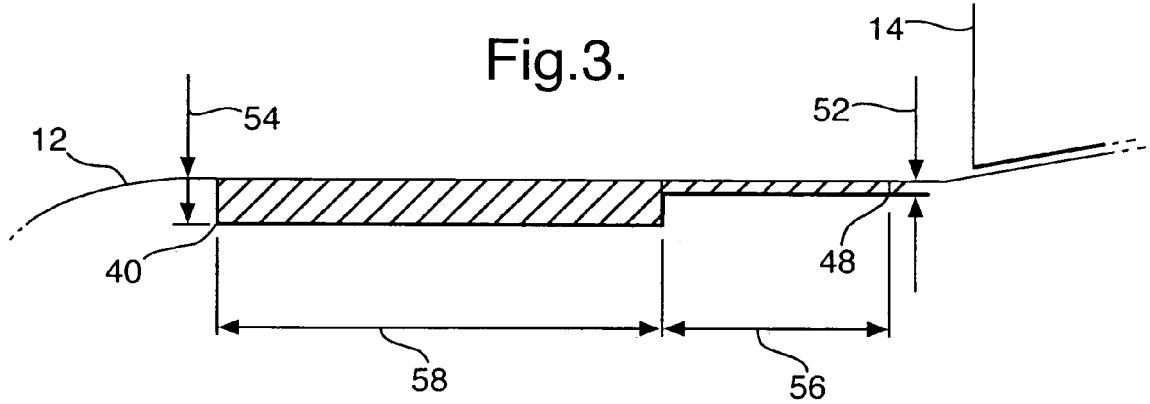
FIG. 3 is an enlarged section of the first embodiment of the passive acoustic liner system.

The present invention, enlarged in FIG. 3, is realised by the particular arrangement of the acoustic liner system in providing a reactance discontinuity between the mode-scattering segment 48 and the sound-absorbing segment 40 such that mode-scattering of the sound field enables the sound-absorbing segment to further absorb the scattered sound. Generally, the passive acoustic liner system for attenuating the sound field comprises the mode scattering segment having a reactance between −12 and −2 ρc and the sound absorbing segment having a reactance between −1 and 0 ρc. For this particular embodiment, the mode-scattering segment 48 comprises a low negative reactance of approximately −5 ρc, and the sound-absorbing segment 40 comprises a reactance of approximately −0.5 ρc.

The impedance of each liner segment 40, 48 determines the distribution of acoustic energy in high and low mode orders propagating in each segment. By introducing a large discontinuity in the reactance at the interface between the scattering and absorptive liner, the mode shapes on different sides of the discontinuity are mis-matched causing energy in low order modes to be redistributed to higher ones, which are then attenuated more in the sound absorbing segment 40.

As should be appreciated by the skilled artisan reactance X is defined by $$X = -\frac{1}{\tan(2\pi ft/c)}\rho c$$

where f=frequency of the sound field, t is the thickness or depth of the cellular layer, c is the speed of sound, and ρ is the air density. This equation is approximate as it does not consider the effects of the inertance of the facing sheet.

It is appreciated that the term "ρc" is a non-dimensional characteristic relative term which relates to the reactance of the segment to that of air. It is a well known term of the art in the field of acoustic attenuation.

It can be seen that there are two parameters that are proportional to the reactance of a passive liner system in accordance with the present invention. Firstly, the difference in reactance between the sound-absorbing segment and the mode scattering segment is achieved by a difference in thickness (t) of the segments. Secondly, the difference in reactance is achieved by the mode scattering segment effectively altering the speed of sound (M) as the acoustic energy impinges on and through the mode scattering segment.

In a first embodiment of the present invention the radial thickness of the mode-scattering segment 48 is approximately 7 mm for this single layer configuration. The sound-absorbing segment 40 is designed to attenuate broadband noise (generated by the different engine operating conditions and comprises a corresponding broad range of noise modes), which is in the range 500 Hz to 5000 Hz. The radial thickness of the sound-absorbing segment 40 is approximately 28 mm. For this embodiment, the thickness corresponds to ¼ wavelength for a frequency of approximately 3000 Hz. The mode-scattering segment 48 and the sound-absorbing segment 40 each comprise similar sandwich panel construction as described hereinbefore.

The mode-scattering segment 48, closest to the fan, is designed to comprise a negative reactance of approximately −5 ρc. The acoustically downstream sound-absorbing segment 40 has a reactance of approximately −0.5 ρc, which is typical of current absorptive liner designs. The resistance of the two segments is 2.5 ρc, but typically the passive acoustic liner system may comprise a resistance between 1 and 4 ρc.

The (axial) length 56 of the mode-scattering segment 48 is 313 mm and the (axial) length of the sound-absorbing segment 40 is 1020 mm. It is preferable for the mode-scattering segment 48 to be approximately 30% of the total length of the liner system 50. However, in other applications the mode-scattering segment 48 may be between approximately 10 and 40% of the total length of the liner system 50. The relative lengths of the segments are determined based on optimisation of the required amount of scattering and subsequent absorption, while also considering other operating speeds of the engine which generated other modes.

For the frequencies described herein in relation to an aero-engine application, the porous face sheet 46 comprises a porosity of 9%, but may readily be within the range of 6–12% porosity. Alternatively the desired face sheet resistance could be achieved by utilising a metallic weave or mesh bonded to a support sheet.

In applications for aero-engines or otherwise, to realise the advantages of the present invention, the sound absorbing segment 40 comprises a (radial) thickness of at least twice the thickness of the mode scattering segment 48. Further, the mode scattering segment 48 comprises a thickness between 10% and 50% of the thickness of the sound absorbing segment 40. In such applications where space is restricted and compromised, good noise attenuation is achieved where the sound absorbing segment comprises a thickness between 20 mm and 50 mm and the mode scattering segment comprises a thickness between 5 mm and 10 mm. The acoustic liner system of the present invention is particularly beneficial where the sound-absorbing segment comprises a length between 2 and 10 times the length of the mode-scattering segment.

Figure 4:
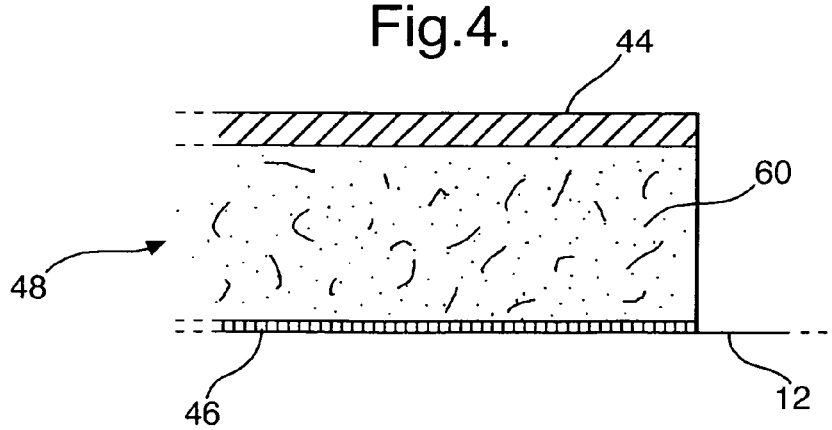
FIG. 4 is an enlarged section of a second embodiment of the passive acoustic liner system.

Referring to FIG. 4, for a second embodiment of the present invention the difference in reactance is achieved by the mode scattering segment 48 being adapted to effectively alter the speed of sound (M) as the acoustic energy impinges on and through the mode scattering segment 48. This embodiment incorporates a fibrous material 60 in preference to the cellular structure 42 of the first embodiment. Although the fibrous material alters the reactance, the speed of sound also increases, which in turn means that the thickness of the liner is increased. This is particularly advantageous in that the thickness of the mode scattering segment 48 and the sound-absorbing segment 40 may be designed to match retrofit applications for example.

This second embodiment may also be realised by the use of many other porous-to-sound materials such as foams and lightly sintered materials.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A passive acoustic liner system for attenuating a sound field comprising, in acoustic series, a mode-scattering segment and a sound-absorbing segment, wherein the mode scattering segment provides a reactance between −12 and −2 ρc and the sound absorbing segment provides a reactance between −1 and 0 ρc thereby providing a reactance discontinuity such that mod-scattering of the sound field enables the sound absorbing segment to further absorb the scattered sound.

2. A passive liner system as claimed in claim 1 wherein the difference in reactance between the sound-absorbing segment and the mode scattering segment is achieved by a difference in thickness of the segments.

3. A passive liner system as claimed in claim 1 wherein the thickness of the sound absorbing segment is at least twice the thickness of the mode scattering segment thereby providing the reactance discontinuity capable of mod-scattering the sound field so that the sound-absorbing segment further absorbs scattered sound.

4. A passive liner system as claimed in claim 1 wherein the thickness of the mode scattering segment is between 10% and 50% of the thickness of the sound absorbing segment.

5. A passive liner system as claimed in claim 1 wherein the thickness of the sound absorbing segment comprises a thickness between 20 mm and 50 mm and the thickness of the mode-scattering segment is between 5 mm and 10 mm.

6. A passive liner system as claimed in claim 1 wherein the mode-scattering segment and the sound-absorbing segment comprises a porous face sheet, a layer of cells and an impervious sheet, the porous face sheet exposed to the sound field.

7. A passive liner system as claimed in claim 1 wherein the difference in reactance between the sound-absorbing segment and the mode scattering segment is achieved by the mode scattering segment comprising a porous material.

8. A passive liner system as claimed in claim 7 wherein the porous material comprises any one or more from the group comprising a fibrous material and a foam material.

9. A passive liner system as claimed in claim 1 wherein the sound-absorbing segment comprises a length between 2 and 10 times the length of the mode-scattering segment.

10. A gas turbine engine comprising a passive liner system as claimed in claim 1 wherein the engine further comprises a duct through which the sound field emanates and the passive liner system disposed to the radially inner wall of the duct.

11. A gas turbine engine as claimed in claim 10 where in the duct is any one of the group comprising an exhaust nozzle or an intake and a bypass duct.

* * * * *